United States Patent [19]

Luck

[11] Patent Number: 5,116,801

[45] Date of Patent: * May 26, 1992

[54] CATALYSTS FOR THE SELECTIVE REDUCTION OF NITROGEN OXIDES AND PROCESS FOR PREPARING THE CATALYST

[75] Inventor: Francis Luck, Noisy Le Grand, France

[73] Assignee: Rhone-Poulenc Chimie, Courbevoie, France

[*] Notice: The portion of the term of this patent subsequent to Aug. 6, 2008 has been disclaimed.

[21] Appl. No.: 682,693

[22] Filed: Apr. 9, 1991

Related U.S. Application Data

[62] Division of Ser. No. 368,605, Jun. 20, 1989, Pat. No. 5,037,792.

[30] Foreign Application Priority Data

Jun. 20, 1988 [FR] France .................. 88 08220

[51] Int. Cl.$^5$ .................. B01J 21/10; B01J 23/06; B01J 23/22; B01J 23/28; B01J 23/30; B01J 23/84; B01J 23/85
[52] U.S. Cl. .................. 502/307; 502/306; 502/312; 502/524
[58] Field of Search ............... 502/306, 307, 312, 524

[56] References Cited

U.S. PATENT DOCUMENTS

| | | | |
|---|---|---|---|
| 3,368,982 | 2/1968 | Milbourne | 502/524 X |
| 4,081,408 | 3/1978 | Fischer et al. | 252/465 |
| 4,256,722 | 3/1981 | Carrier | 423/594 |
| 4,274,981 | 6/1981 | Suzuki et al. | 502/524 X |
| 4,456,703 | 6/1984 | Aldridge | 502/524 X |

FOREIGN PATENT DOCUMENTS

| | | |
|---|---|---|
| 0094206 | 11/1983 | European Pat. Off. |
| 2652556A1 | 6/1977 | Fed. Rep. of Germany |
| 56-010338 | 6/1979 | Japan |
| WO87/06158 | 10/1987 | PCT Int'l Appl. |

Primary Examiner—W. J. Shine
Attorney, Agent, or Firm—Burns, Doane, Swecker & Mathis

[57] ABSTRACT

Novel catalysts that include a porous alumina support having a surface coating of at least one spinel compound thereon, e.g., a compound having the formula $M^1Al_2O_4$, and a catalytically active phase deposited onto such coated support, e.g., a catalytically active metallic oxide, are well adopted for the catalytic ammonia reduction of $NO_x$ values contained in gaseous flowstreams thereof, which gaseous flowstreams typically also contain $SO_x$ values.

14 Claims, No Drawings

CATALYSTS FOR THE SELECTIVE REDUCTION OF NITROGEN OXIDES AND PROCESS FOR PREPARING THE CATALYST

This application is a division of application Ser. No. 07/368,605, filed Jun. 20, 1989, now U.S. Pat. No. 5,037,792.

BACKGROUND OF THE INVENTION

1. Field of the Invention

The present invention relates to novel catalysts, to a process for the preparation of such novel catalysts, and to a process for the elimination of nitrogen oxides contained in a gaseous flowstream by catalytic reduction employing said novel catalysts.

2. Description of the Prior Art

French Patent No. 79/05,598 describes a catalyst for reducing the nitrogen oxides NO and $NO_2$ ($NO_x$) contained in a gaseous flowstream to molecular nitrogen, in the presence of ammonia.

This catalyst, consisting of a porous alumina support and a catalytically active phase deposited thereon, has been found to be especially effective for the reduction of residual nitrogen oxides formed during the synthesis of nitric acid by the oxidation of ammonia with oxygen. The catalyst has the added advantage of being suitable for use at relatively low temperatures, on the order of 190° to 250° C., resulting in a saving of energy, as it is not necessary to reheat the gaseous flowstreams to be treated. However, it was discovered that such a catalyst presents certain disadvantages when used for the catalytic/ammonia reduction of the nitrogen oxides contained in gaseous flowstreams which also contain small amounts of the oxides of sulfur.

In effect, it was found that the presence of sulfur oxides, $SO_2$ and $SO_3$ ($SO_x$), in the gaseous flowstream gives rise to a rapid deactivation of the catalyst.

This deactivation may be attributed to the formation of ammonium bisulfate, $NH_4HSO_4$, and ammonium sulfate, $(NH_4)_2SO_4$, by reaction between the sulfur oxides, the water present in the gaseous flowstream and the ammonia that is absolutely necessary for the catalytic reduction of nitrogen oxides.

The ammonium bisulfate is actually deposited in the pores of the catalyst, thereby reducing both catalyst volume and active specific surface area thereof. Furthermore, it too was found that the ammonium bisulfate reacted with the alumina to form the compounds $NH_4Al(SO_4)_2$ and $Al_2(SO_4)_3$, which also deactivate the catalyst.

Gaseous flowstreams of this type, containing the nitrogen oxides $NO_x$ and minor amounts of the sulfur oxides $SO_x$ typically comprise vehicular exhaust gases, the residual gases from boilers and other stationary combustion units, such as the gases from thermal power stations, which are already substantially desulfurized.

Catalysts capable of catalytically reducing $NO_x$ under conditions similar to those described above have already been proposed to this art.

These are catalysts, the active phase of which is deposited onto a titanium dioxide support.

However, such catalysts have an optimum activity at temperatures on the order of 300° to 400° C. Furthermore, they are relatively expensive, as titanium dioxide is more costly than alumina. Another disadvantage of the $TiO_2$ supports resides in their low mechanical properties.

SUMMARY OF THE INVENTION

Accordingly, a major object of the present invention is the provision of novel catalysts which are especially suitable for the selective ammonia reduction of the nitrogen oxides contained in gaseous flowstreams that also contain minor amounts of $SO_x$ values.

Another object of the present invention is the provision of novel catalysts which permit the selective reduction of nitrogen oxides at temperatures on the order of 200° to 400° C., advantageously temperatures ranging from 200° to 300° C.

Yet another object of this invention is the provision of a process for the preparation of such novel catalysts.

Briefly, the present invention features novel catalysts comprising a porous alumina support and at least one catalytically active phase deposited thereon, and wherein said support comprises a surface coating of at least one compound of the spinel type.

DETAILED DESCRIPTION OF THE PREFERRED EMBODIMENTS OF THE INVENTION

More particularly according to the present invention, the spinel type compound advantageously has the general formula:

$$M^1Al_2O_4$$

in which $M^1$ is at least one divalent metallic element selected from among magnesium, zinc, nickel or cobalt.

In a preferred embodiment of the invention, the divalent metallic element is nickel or zinc.

The amount of the divalent metallic element $M^1$ in the catalysts of the invention, expressed as its oxide $M^1O$, advantageously ranges from 2% to 45% and preferably from 5% to 30% by weight relative to the total weight of the catalyst.

According to this invention, it is preferred to use a catalyst support based on alumina, in which the volume of pores having a diameter larger than 100 nm is greater than 25 cm$^3$/100 g and more particularly ranges from 25 to 70 cm$^3$/100 g, and the volume of pores having a diameter larger than 30 nm is greater than 40 cm$^3$/100 g and more particularly ranges from 43 to 70 cm$^3$/100 g, with the total pore volume ranging from 80 to 120 cm$^3$/100 g.

The specific surface area of said support based on alumina preferably is a maximum of 160 m$^2$/g and more generally ranges from 90 to 150 m$^2$/g.

The alumina suitable for use according to the invention is typically in the $\gamma$, $\theta$, $\delta$ and $\alpha$ crystalline forms, with the forms $\gamma$, $\theta$ and $\delta$ generally being the preponderant and the $\alpha$ form being present in trace amounts.

The catalytically active phase according to this invention may comprise at least one metallic oxide, such as the oxides of vanadium, tungsten, molybdenum, iron or cobalt.

The amount of active phase advantageously ranges from 0.5% to 50% by weight and preferably from 2% to 30% by weight relative to the total weight of the catalyst.

It has also now unexpectedly been determined that the catalytically active phase may comprise, on the one hand, vanadium oxide $V_2O_5$, and, on the other, either molybdenum oxide $MoO_3$ or tungsten oxide $WO_3$. A weight ratio between the $V_2O_5$ and the $MoO_3$ or $WO_3$ ranging from 1 to 0.1 is preferred.

This invention also features a process for the preparation of the novel catalysts described above.

This process comprises, in a first stage, impregnating a porous alumina support in the form of, for example, spheroidal particles or granules, with a solution of at least one divalent metallic element $M^1$, with the concentration of said metallic element in the solution being such that the final content of the metallic element $M^1$ be within the limits specified above.

The alumina support treated in this manner is, in a second stage, dried for approximately one-half to six hours at temperatures of from 100° to 200° C. This is followed by calcination generally carried out in air at temperatures on the order of 700° to 1,000° C. and preferably from 750° to 850° C., for about 1 to 6 hours.

It is found that after the aforedescribed treatment, a coating of a spinel type compound of the formula $M^1Al_2O_4$ is formed on the surface of the alumina support.

The operations of impregnation, drying and calcination described above may be repeated one or several times.

The impregnating solutions are typically aqueous solutions, optionally containing nickel, magnesium, zinc and/or cobalt salts.

These salts, for example, comprise the nitrates or acetates of such metals.

In a third stage of the process of the invention, the alumina support coated with a layer of the spinel type compound is impregnated with a solution of at least one compound of the metal providing the metallic oxide which constitutes the catalytically active phase The concentration of the compound of such catalytically active metal is such that the final content in the metallic oxide is within the limits described above.

In a fourth stage, the catalyst is dried for about one-half to six hours at temperatures ranging from 100° to 200° C., then calcined, typically in air, for 1 to 3 hours at temperatures of from 400° to 600° C., preferably from 450° to 550° C.

The impregnating solutions are typically aqueous solutions, optionally containing salts of precursor metals of the oxides of vanadium, molybdenum, tungsten, iron and/or cobalt.

Exemplary of these salts are ammonium salts such as ammonium dimolybdate, ammonium heptamolybdate, ammonium metatungstate, and the like.

A representative impregnating solution containing a vanadium compound is that solution produced by dissolving vanadium pentoxide in an oxalic acid solution.

The impregnations of stages 1 and 3 may be repeated one or several times and are followed each time by the operations of drying and calcination, such as described in stages 2 and 4 above.

This invention also features a process for the ammonia reduction of nitrogen oxides utilizing the novel catalysts described above.

To eliminate nitrogen oxides from gaseous flowstreams comprised thereof, the catalyst is charged into an appropriate reactor in the form of a stationary or fluidized bed.

Typically, the gaseous flowstream to be purified according to the invention is a residual gas flowstream from a chemical process or a stationary combustion unit and which contains, among other substances:

(i) nitrogen;

(ii) oxygen, in an amount typically ranging from 10,000 to 100,000 vpm;

(iii) nitrogen oxides $NO_x$, in an amount typically ranging from 100 to 10,000 vpm;

(iv) sulfur oxides $SO_x$, in an amount typically ranging from 1 to 2,000 vpm; and (v) water, in an amount typically ranging from 100 to 200,000 vpm.

In general, the selective reduction of the $NO_x$ according to the invention requires a molecular ratio $NH_3/NO_x$ less than 1.1 and preferably ranging from 0.8 to 1, depending on the desired degree of conversion and the $NO_x$ content of the gas to be treated.

The pressure of the gaseous flowstream to be treated is such as to favor the conversion of the $NO_x$ to $N_2$.

Advantageously, such pressure ranges from 1 to 20 bar, preferably from 1 to 12 bar.

The temperature used to carry out the reduction process of the invention varies as a function of the volume velocity per hour of the gas to be treated, but typically it ranges from 200° to 400° C., preferably from 200° to 300° C.

The volume velocity per hour (VVH) of the gases to be treated is a function of the temperature of the catalyst, wherein a higher temperature permits a larger VVH for a given result.

Usually, within the temperature range defined above, the VVH ranges from 4,000 to 250,000 $h^{-1}$, preferably from 7,000 to 40,000 $h^{-1}$.

In order to further illustrate the present invention and the advantages thereof, the following specific examples are given, it being understood that same are intended only as illustrative and in nowise limitative.

EXAMPLE 1

Preparation of a Catalyst (A) According to the Invention

For the preparation of a catalyst (A), an alumina in the form of spheroidal particles having a diameter of 3 mm was used; it had the following characteristics:

| (i) Specific surface | 120 $m^2/g$ |
|---|---|
| (ii) Total pore volume | 98 $cm^3/100\ g$ |
| (iii) Volume of pores with diameters greater than 100 nm | 30 $cm^3/100\ g$ |
| (iv) Volume of pores with diameters greater than 30 nm | 43 $cm^3/100\ g$ |

100 g of this support were impregnated with 98 ml of an aqueous solution of nickel nitrate.

After impregnation, the resulting product was dried in an oven at 120° C. for 4 hours, then calcined at 750° C. for 4 hours in air.

The nickel content of the product obtained in this manner was 20% by weight, expressed as the oxide.

The product was subsequently impregnated with an aqueous solution of ammonium metatungstate and vanadyl oxalate.

The product obtained was dried at 120° C. for 4 hours in an oven, then calcined for 2 hours at 500° C. for 2 hours at 500° C. in air.

The composition of the catalyst (A) is reported in Table I.

EXAMPLE 2

Preparation of a Catalyst (B) According to the Invention 100 g of the alumina support as described in Example 1 was impregnated with 98 ml of an aqueous solution of zinc nitrate.

After impregnation, the resulting product was dried and then calcined under the conditions of Example 1. The zinc content of the product obtained in this manner was 20% by weight, expressed as the oxide.

The product was then impregnated again with the same zinc nitrate solution.

Subsequently, it was dried and calcined again as in Example 1.

The zinc content of the product obtained in this manner was 40% by weight, expressed as the oxide.

The product was then impregnated with an aqueous solution of ammonium metatungstate and vanadyl oxalate, then dried in an oven at 120° C. for 4 hours, prior to calcining it for 2 hours at 500° C. in air.

The composition of the catalyst (B) is reported in Table I.

EXAMPLE 3

Preparation of a Catalyst (C) Not According to the Invention

The alumina used in Example 1 was again used in this example. 100 g of this support were impregnated with 98 ml of an aqueous solution of ammonium metatungstate and vanadyl oxalate.

The resulting product was dried in an oven at 120° C. for 4 hours, prior to calcining at 500° C. for 2 hours in air.

The composition of catalyst (C) is reported in Table I.

EXAMPLE 4

Preparation of a Catalyst (D) Not According to the Invention

A silica having the following characteristics was used in the preparation of catalyst (D); it was in the form of spheroidal particles having diameters of 3 mm and displaying the following characteristics:

| | |
|---|---|
| (i) Specific surface | 250 m²/g |
| (ii) Total pore volume | 55 cm³/100 g |
| (iii) Volume of pores with diameters larger than 100 nm | 13 cm³/100 g |
| (iv) Volume of pores with diameters larger than 30 nm | 16 cm³/100 g |

100 g of this support were impregnated with 98 ml of an aqueous solution of nickel nitrate.

After impregnation, the resulting product was dried in an oven at 120° C. for 4 hours, prior to calcining for 4 hours at 750° C. in air.

The nickel content of the product obtained in this manner was 20% by weight, expressed as the oxide.

The product was then impregnated with an aqueous solution of ammonium metatungstate and vanadyl oxide, then dried in an oven at 120° C. for 4 hours, prior to calcining for 2 hours at 500° C. in air.

The composition of catalyst (D) is reported in Table I.

EXAMPLE 5

Evaluation of the Catalysts (A), (B), (C) and (D)

The catalysts prepared in the above examples were tested to determine the efficiency of their elimination of $NO_x$ and their resistance to deactivation in the presence of $SO_x$, in an apparatus comprising pressure and flow rate controlled sources of NO, $NO_2$, $SO_2$, $NH_3$, $H_2O$ and $N_2$. The gaseous flow resulting from the mixture of gases was employed as feed to a reactor containing a volume of 25 cm³ of the catalyst and placed in a temperature controlled enclosure, which flowstream was then transferred into an apparatus to measure $NO_x$ content by chemiluminescence. The efficiency of $NO_x$ elimination was determined by the following equation:

$$\text{Degree of } NO_x \text{ elimination (\%)} = [(\text{inlet } NO_x - \text{outlet } NO_x)/\text{inlet } NO_x] \times 100$$

wherein:

inlet $NO_x$ = concentration of $NO_x$ at the reactor inlet;
Outlet $NO_x$ = concentration of $NO_x$ at the reactor outlet.

The results obtained are reported in Table I, utilizing a mixture of gases containing:

1,500 vpm $NO_x$
150 Vpm $SO_x$
1,400 vpm $NH_3$
3% $O_2$
3% $H_2O$
Remainder = $N_2$ with a volume velocity per hour of 8,000 h⁻¹, the catalytic bed being heated to a temperature of 280° C. and the pressure of the gases to be treated being 1 bar absolute.

The results of Table I reflect that the catalysts according to the invention have higher $NO_x$ elimination capabilities and durabilities vis-a-vis those catalysts not according to the invention.

TABLE I

| Catalyst | Composition (% by weight) | | | | | | Elimination of $NO_x$ (%) after | | |
|---|---|---|---|---|---|---|---|---|---|
| | $WO_3$ | $V_2O_5$ | NiO | ZnO | $Al_2O_3$ | $SiO_2$ | 10 h | 100 h | 900 h |
| (A) | 7 | 5 | 18 | — | 70 | — | 98.5 | 98.2 | 98.0 |
| (B) | 6 | 4 | — | 26 | 64 | — | 97.3 | 96.2 | 96.4 |
| (C) | 7 | 5 | — | — | 88 | — | 95.2 | 83.6 | 10.5 |
| (D) | 7 | 5 | 18 | — | — | 70 | 25.1 | 24.2 | 21.0 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A catalyst comprising a porous alumina support having a surface coating of at least one spinel compound thereon, and a catalytically active phase deposited onto such coated support said catalytically active phase comprising vanadium oxide $V_2O_5$ and either molybdenum oxide $MoO_3$ or tungsten oxide $WO_3$.

2. The catalyst as defined by claim 1, said at least one spinel compound having the formula:

$$M^1Al_2O_4$$

wherein $M^1$ comprises magnesium, zinc, nickel or cobalt.

3. The catalyst as defined by claim 2, wherein $M^1$ comprises nickel or zinc.

4. The catalyst as defined by claim 2, wherein the amount of $M^1$, expressed as its oxide $M^1O$, ranges from 2% to 45% by weight thereof.

5. The catalyst as defined by claim 4, such amount ranging from 5% to 30% by weight thereof.

6. The catalyst as defined by claim 1 said support having a volume of pores with diameters greater than 100 nm of greater than 25 $Cm^3/100$ g, a volume of pores with diameters greater than 30 nm of greater than 40 $cm^3/100$ g, a total pore volume ranging from 80 to 120 $cm^3/100$ g, and a specific surface area of at most 160 $m^2/g$.

7. The catalyst as defined by claim 6, said support having a volume of pores with diameters greater than 100 nm ranging from 25 to 70 $cm^3/100$ g, and a volume of pores with diameters greater than 30 nm ranging from 43 to 70 $cm^3/100$ g.

8. The catalyst as defined by claim 6, said support having a total specific surface area ranging from 90 to 150 $m^2/g$.

9. The catalyst as defined by claim 6, said support comprising a major amount of the crystalline phases gamma, theta and delta, and a trace amount of the alpha crystalline phase.

10. The catalyst as defined by claim 1, said catalytically active phase comprising from 0.5% to 50% by weight thereof.

11. The catalyst as defined by claim 10, said catalytically active phase comprising from 2% to 30% by weight thereof.

12. A process for the preparation of the catalyst as defined by claim 2, comprising (a) impregnating said alumina support with a solution of at least one divalent metallic $M^1$ compound, (b) drying and calcining said impregnated support, (c) impregnating said dried and calcined support with a solution of at least one precursor of an oxide of vanadium, tungsten or molybdenum and (d) drying and calcining said impregnated support.

13. The process as defined by claim 12, said drying and calcining (b) respectively being carried out at temperatures ranging from 100° to 200° C. and from 700° to 1,000° C.

14. The process as defined by claim 13, said drying and calcining (d) respectively being carried out at temperatures ranging from 100° to 200° C. and from 400° to 600° C.

* * * * *